(12) United States Patent
O'Brien et al.

(10) Patent No.: US 12,428,046 B2
(45) Date of Patent: Sep. 30, 2025

(54) TILT BRAKE MECHANISM FOR HAND TRUCK

(71) Applicant: Data-Metalcraft, Inc., Chaska, MN (US)

(72) Inventors: Gene O'Brien, Chaska, MN (US); Robert V. Albertson, Chaska, MN (US); Michael Holden, Chaska, MN (US)

(*) Notice: Subject to any disclaimer, the term of this patent is extended or adjusted under 35 U.S.C. 154(b) by 783 days.

(21) Appl. No.: 17/478,228

(22) Filed: Sep. 17, 2021

(65) Prior Publication Data

US 2022/0089208 A1 Mar. 24, 2022

Related U.S. Application Data

(60) Provisional application No. 63/155,694, filed on Mar. 2, 2021, provisional application No. 63/080,587, filed on Sep. 18, 2020.

(51) Int. Cl.
*B62B 5/04* (2006.01)
*B62B 1/10* (2006.01)

(52) U.S. Cl.
CPC .............. *B62B 5/0461* (2013.01); *B62B 1/10* (2013.01); *B62B 5/048* (2013.01)

(58) Field of Classification Search
CPC .......... B62B 5/0461; B62B 5/048; B62B 1/10
See application file for complete search history.

(56) References Cited

U.S. PATENT DOCUMENTS

| | | | |
|---|---|---|---|
| 2,147,764 A | 2/1939 | Brown | |
| 3,666,285 A | 5/1972 | Fertig | |
| 4,819,767 A * | 4/1989 | Laird | B62B 5/04 188/71.3 |
| 5,263,727 A * | 11/1993 | Libit | B62B 1/125 280/646 |
| 5,722,515 A * | 3/1998 | Wyse | F16D 49/10 280/47.27 |
| 6,386,552 B1 | 5/2002 | Bierma | |
| 2005/0023787 A1* | 2/2005 | Haynes | B62B 3/002 280/79.11 |
| 2012/0280462 A1 | 11/2012 | Torrison | |
| 2013/0147163 A1* | 6/2013 | Chang | B62B 1/12 280/652 |

FOREIGN PATENT DOCUMENTS

| | | | | |
|---|---|---|---|---|
| EP | 3708458 A1 * | 9/2020 | ............... | B62B 1/20 |
| WO | WO-2017152902 A1 * | 9/2017 | ............... | B62B 1/10 |

* cited by examiner

*Primary Examiner* — Ishal R Sahni (57) ABSTRACT

A braking mechanism for a hand truck or dolly that, when installed on the hand truck, slows the movement of the hand truck when the hand truck is tilted rearwardly. The more the hand truck is tilted rearwardly, the greater the braking force applied by the braking mechanism against the wheels.

11 Claims, 6 Drawing Sheets

TILT BRAKE MECHANISM FOR HAND TRUCK

RELATED APPLICATIONS

This application claims benefit of and priority to U.S. Provisional Application Ser. No. 63/080,587 filed Sep. 18, 2020 entitled Tilt Brake Mechanism For Hand Truck, U.S. Provisional Application Ser. No. 63/155,694 filed Mar. 2, 2021 entitled Tilt Brake Mechanism For Hand Truck, both of which are hereby incorporated herein by reference in their entireties.

BACKGROUND OF THE INVENTION

Hand trucks or "dollies" provide significant leverage and allow a single person to move large loads with relative ease. However, if the load is being lowered down a ramp or incline, the wheeled nature of the hand truck can easily result in a loss of control of the heavy load. Loss of control may cause damage to the load or injury to the operator.

Several braking mechanisms for hand trucks have been devised to address this issue, however, each of the available designs require the operation of a brake lever mounted on or near the handle of the hand truck. Grasping a brake in this manner is not always optimal, depending on the orientation of the load and the travel path of the hand truck.

OBJECTS AND SUMMARY OF THE INVENTION

The present invention is directed to a mechanism that automatically activates a braking mechanism when the hand truck is tilted back toward the operator. This tilting action happens naturally when a hand truck is being lowered down an incline, such as down a ramp from a truck. By activating a brake automatically, in a progressive manner, control is automatically established, and the user is free to grab the handle of the hand truck in any desired manner without losing the braking capability. Moreover, there is no danger of accidentally releasing the brake in wet conditions, etc.

One aspect of the invention provides a braking mechanism for a hand truck that includes a lever arm that extends rearward toward the operator. Tilting the hand truck toward the operator causes an interaction between the ground and the lever, causing the lever to pivot upwardly, relative to the hand truck. This lever is operably associated with a braking mechanism such that this pivot engages the braking mechanism.

In one or more embodiments, the braking force applied by the braking mechanism increases as more pressure is placed on the lever.

In one or more embodiments, the braking mechanism activated by the lever engages an interference brake against an outside surface of at least one wheel of the hand truck.

In one or more embodiments, the braking mechanism activated by the lever engages an interference brake against an inside surface of at least one wheel of the hand truck.

In one or more embodiments, the braking mechanism activated by the lever engages a disc brake operably associated with the wheels or an axle of the hand truck.

In one or more embodiments, the braking mechanism activated by the lever engages a magnetic braking system operably connected to the wheels or an axle of the hand truck.

In one or more embodiments, the braking mechanism activated by the lever engages a drum brake associated with one or more hub or rim of the hand truck wheels.

In one or more embodiments, the lever includes a wheel allowing the lever to roll over the ground surface.

In one or more embodiments, the lever includes a disengagement mechanism that places the lever in a disengaged, non-interfering configuration to allow the hand truck to be operated over curbs and other obstacles without engaging the brakes.

One aspect of the invention is a braking mechanism for a hand truck comprising: a lever assembly extending rearwardly from a hand truck such that if the hand truck is tilted rearwardly, the lever assembly contacts a supporting surface on which the hand truck is being used, and further rearward tilting of the hand truck cause the lever assembly to pivot relative to the hand truck; an activation mechanism connected to the lever assembly such that the pivoting of the lever assembly caused by rearward tilting of the hand truck results in interference between the activation mechanism and wheels of the hand truck.

Another aspect of the invention is a method of controlling a downhill descent of a hand truck comprising equipping the hand truck with a braking mechanism that interferes with rotation of wheels of the hand truck as the hand truck is tilted rearwardly.

In at least one embodiment the method of claim includes equipping the hand truck with a braking mechanism that interferes with rotation of wheels of the hand truck as the hand truck is tilted rearwardly comprises equipping the hand truck with the braking mechanism such that the braking mechanism contacts a supporting surface on which the hand truck is being used.

In at least one embodiment the method of claim includes a braking mechanism that contacts the supporting surface with a wheel.

In at least one embodiment the method of claim includes a braking mechanism that includes brake pads that translate outwardly into rims of the wheels of the hand truck when the braking mechanism contacts the ground.

In at least one embodiment the method of claim includes a braking mechanism that includes blades that pivot against tires of the wheels of the hand truck when the braking mechanism contacts the ground.

Yet another aspect of the invention is a hand truck that comprises a frame; a loading tray; an axle; wheels connected to ends of the axle; a braking mechanism that contacts a supporting surface on which the hand truck is being used when the hand truck is tilted rearwardly, said braking mechanism interfering with rotation of the wheels such that a rotational speed of the wheels may be controlled by tilting the hand truck.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Referring now to the Figures, and first to FIGS. 1-4, there is shown an exploded view of a hand truck or dolly 10 with an embodiment 100 of a braking mechanism. The hand truck 10 may be manufactured with the braking mechanism 100 or may be an existing hand truck that is retrofitted with the braking mechanism 100. The hand truck 10 generally includes a frame 12, a loading tray 14, an axle 16, and wheels 18 on opposite ends of the axle 16. The hand truck 10 shown in FIG. 1 also includes additional handles 20 attached to the frame 12 to provide extra grab points for heavy loads.

Figure 1:
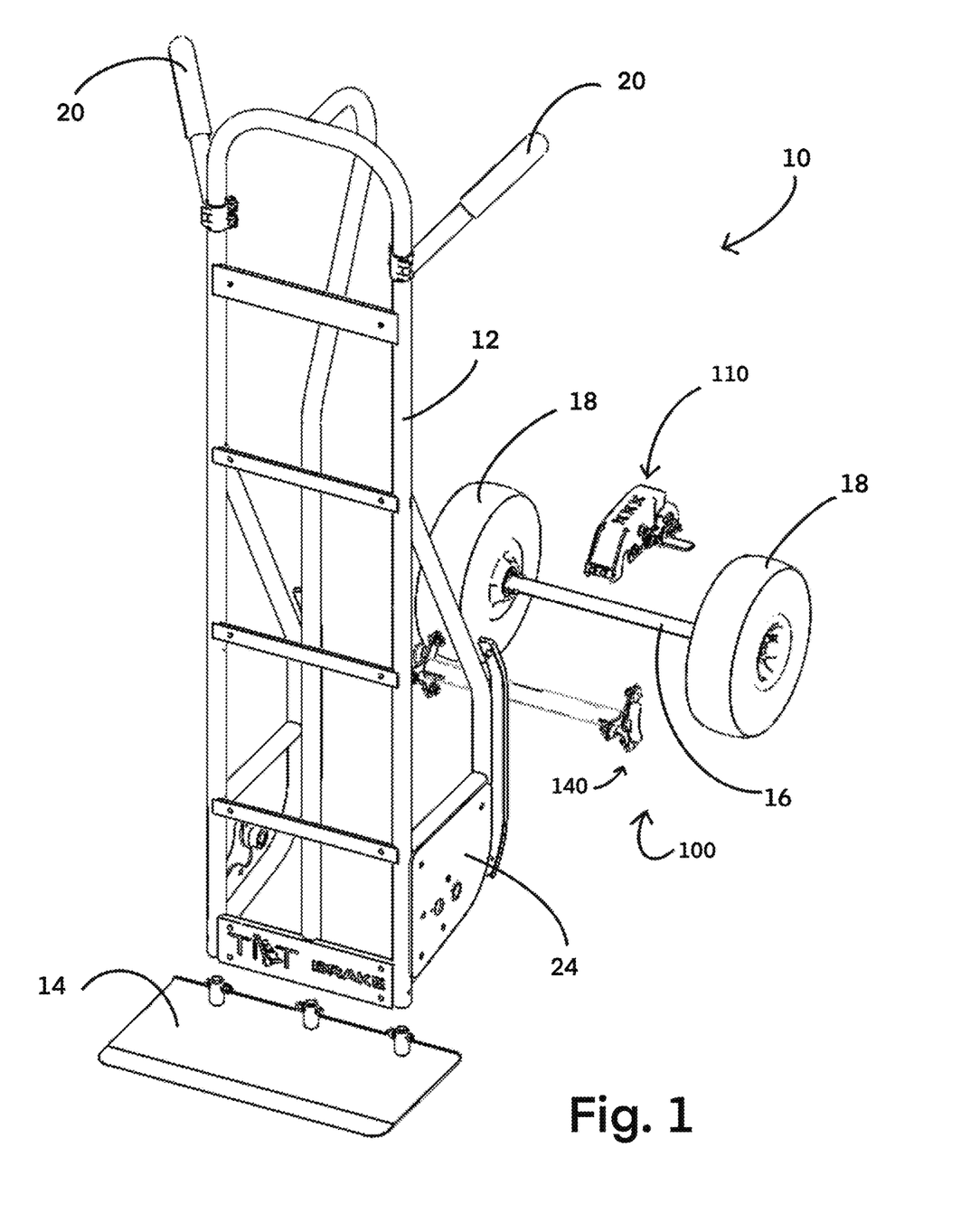
FIG. 1 is an exploded perspective view of an embodiment of the invention.
Figure 2:
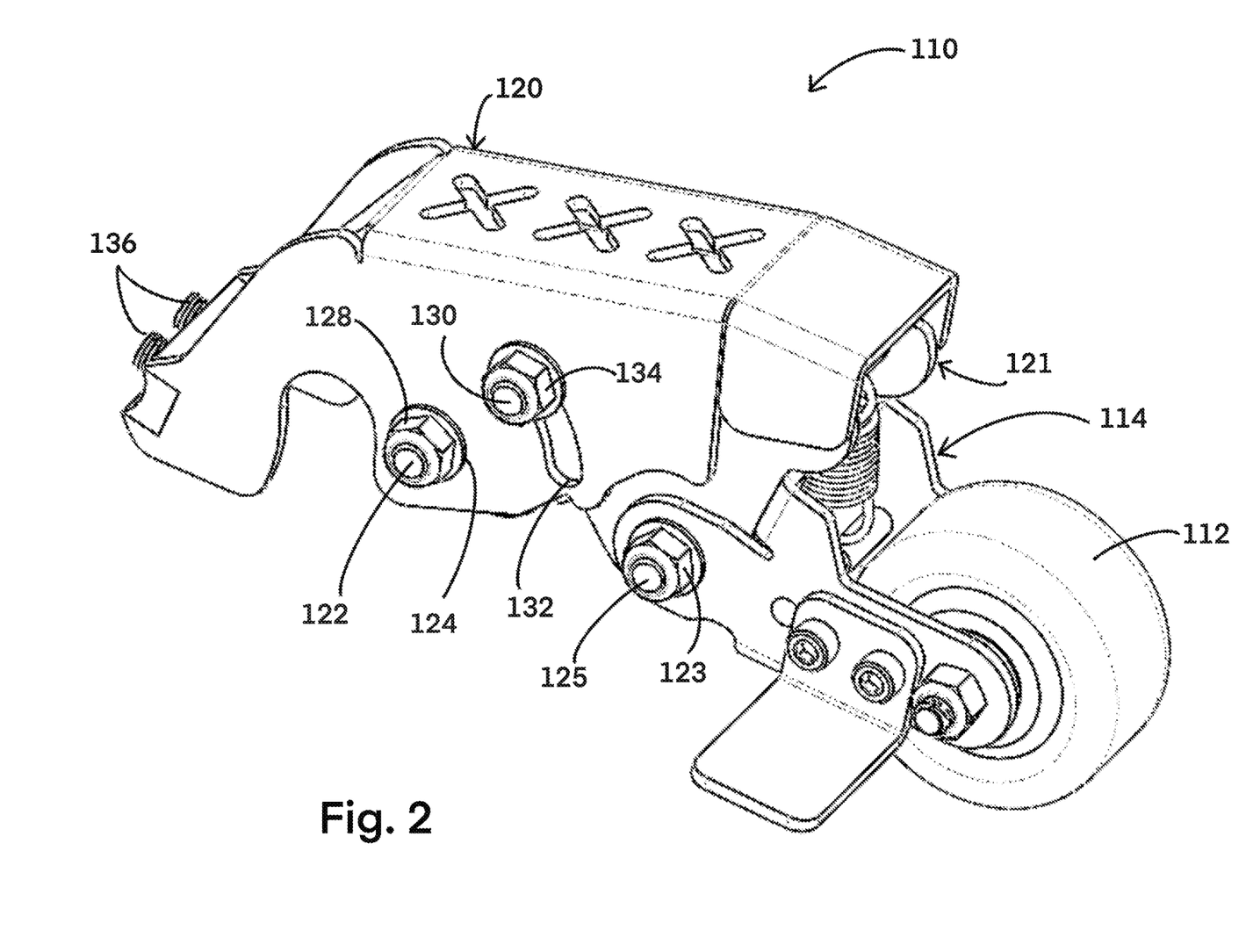
FIG. 2 is a perspective view of an embodiment of a lever assembly of the invention.

The braking mechanism 100 generally includes a lever assembly 110, and an activation mechanism 140. As best seen in FIG. 2, the lever assembly 110 includes a lever wheel 112 that contacts the ground when the dolly is tilted rearwardly. The lever wheel 112 is held in place by a wheel bracket 114, which is connected to an adjustment bracket 120 with an internal connecting bracket 121. The wheel adjustment bracket is connected to the activation mechanism 140.

The wheel bracket 114 is connected to the internal bracket 121 with a cross member 125, secured with a fastener 123, such as a bolt. The internal bracket 121 is connected to the adjustment bracket 120 with two cross members 122, 130.

The first cross member is the pivot cross member 122. The pivot cross member 122 passes through two aligned holes 124 in the adjustment bracket, and two corresponding holes (not shown) in the internal bracket 121 and is held in place with a fastener 128.

The second cross member is the angle adjustment cross member 130. The angle adjustment cross member 130 passes through curved slots 132 in the adjustment bracket 120, and through corresponding holes (not shown) in the internal bracket 121. The angle adjustment cross member 130 is held in place with a fastener 134. Loosening the fastener 134 allows the internal bracket 121, to which the wheel bracket 114 is attached, to be rotated around the angle adjustment cross member 130. In this regard, the curved slots 132 have a radius equal to the distance between the center of the holes 124 and the center of the curved slots 132. The adjustable angle feature of the lever assembly 110 allows the user to find an optimal brake engagement angle when using the dolly to transport a load down various ramp inclines.

The lever assembly 110 is connected to the activation mechanism 140 with bolts 136. One skilled in the art will understand that the cross members and fasteners shown in the figures are represented by nuts and bolts but that other fasteners and cross members could be substituted without departing from the spirit and scope of the invention.

Figure 3:
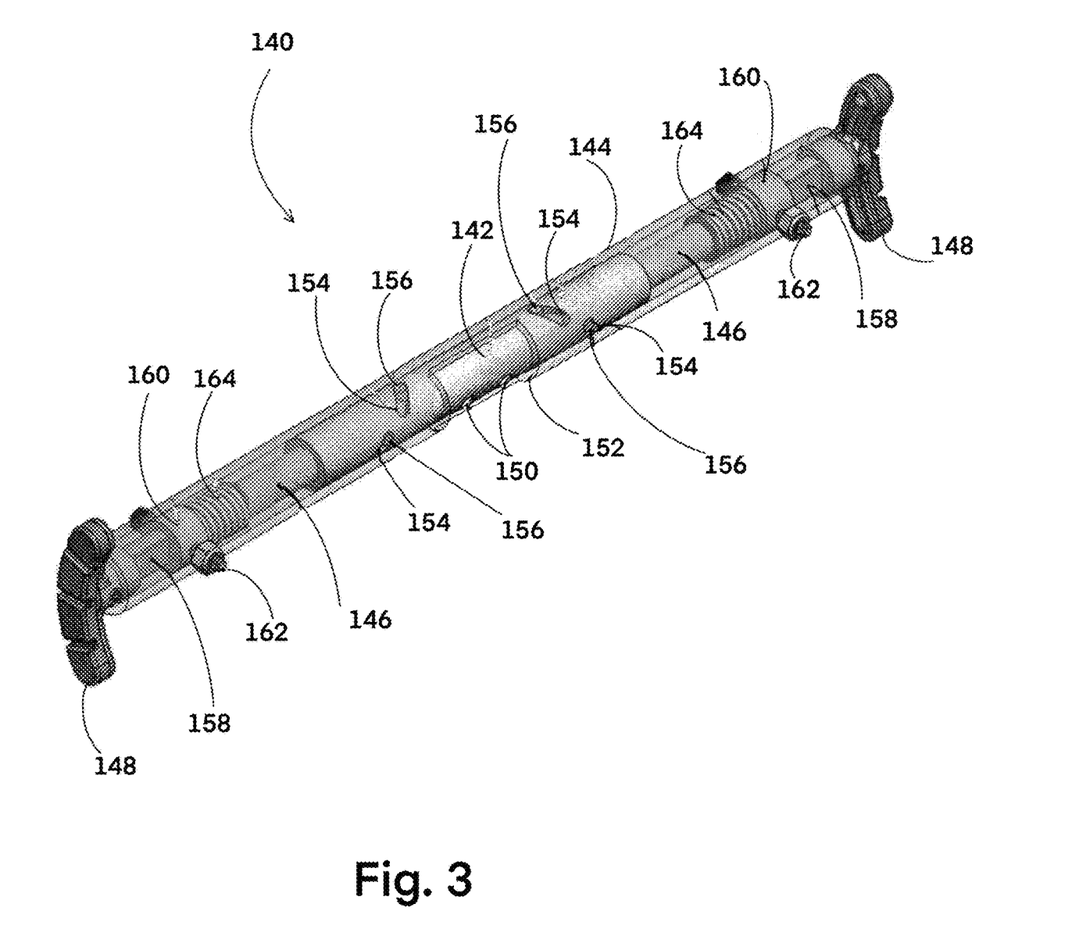
FIG. 3 is a perspective transparent view of an embodiment of a brake activation mechanism of the invention.

The activation mechanism 140 is shown in FIG. 3 and generally includes a center cam 142, a hub 144, two plungers 146, and two brake pads 148.

The center cam 142 connects the lever assembly 110 to the activation mechanism 140 with holes 150 that receive the bolts 136 of the lever assembly 110. The center cam 142 rides within the hub 144 and is allowed to rotate within the hub 144. The hub 144 has a window 152 through which the holes 150 are exposed and defines the amount of rotation allowed by the center cam 142. The center cam 142 further includes at least one pair of angled slots 154. The embodiment shown in FIG. 3 has two pairs of angled slots 154. The center cam 142 is hollow, at least on the ends, and receives the plungers 146 on either side of the center cam 142. The tolerance between the plungers 146 and the center cam 142 allows the plungers 146 to easily move axially within the center cam 142.

The plungers 146 include pins 156 that ride within the angled slots 154. The plungers have non-circular ends 158 that ride through spring stops 160 near the brake pads. The springs stops 160 are secured to the hub 144 with bolts 162 that pass through axial slots (not shown) in the plungers, that are long enough to accommodate the axial travel of the plungers. The non-circular cross-sectional shape of the ends 158 prevent the plungers 146 from rotating with the center cam 142. Thus, when the center cam 142 rotates, the angled slots 154 act against the pins 156, causing the pins to convert the rotational motion of the center cam 142 to axial motion of the plungers 146. Springs 164 resist the axial motion of the plungers 146 by becoming compressed, thus biasing the plungers 146 toward a center, disengaged position.

The brake pads 148 are connected to the ends 158 of the plungers 146. When the plungers 146 translate outwardly, the brake pads 148 act against surfaces of the dolly wheels 18. One skilled in the art will realize that the surfaces of the dolly wheels 18 being acted against could be the rims, the tires, or other surfaces such as discs attached to the rims for the purpose of braking rotation of the wheels 18.

Figure 4:
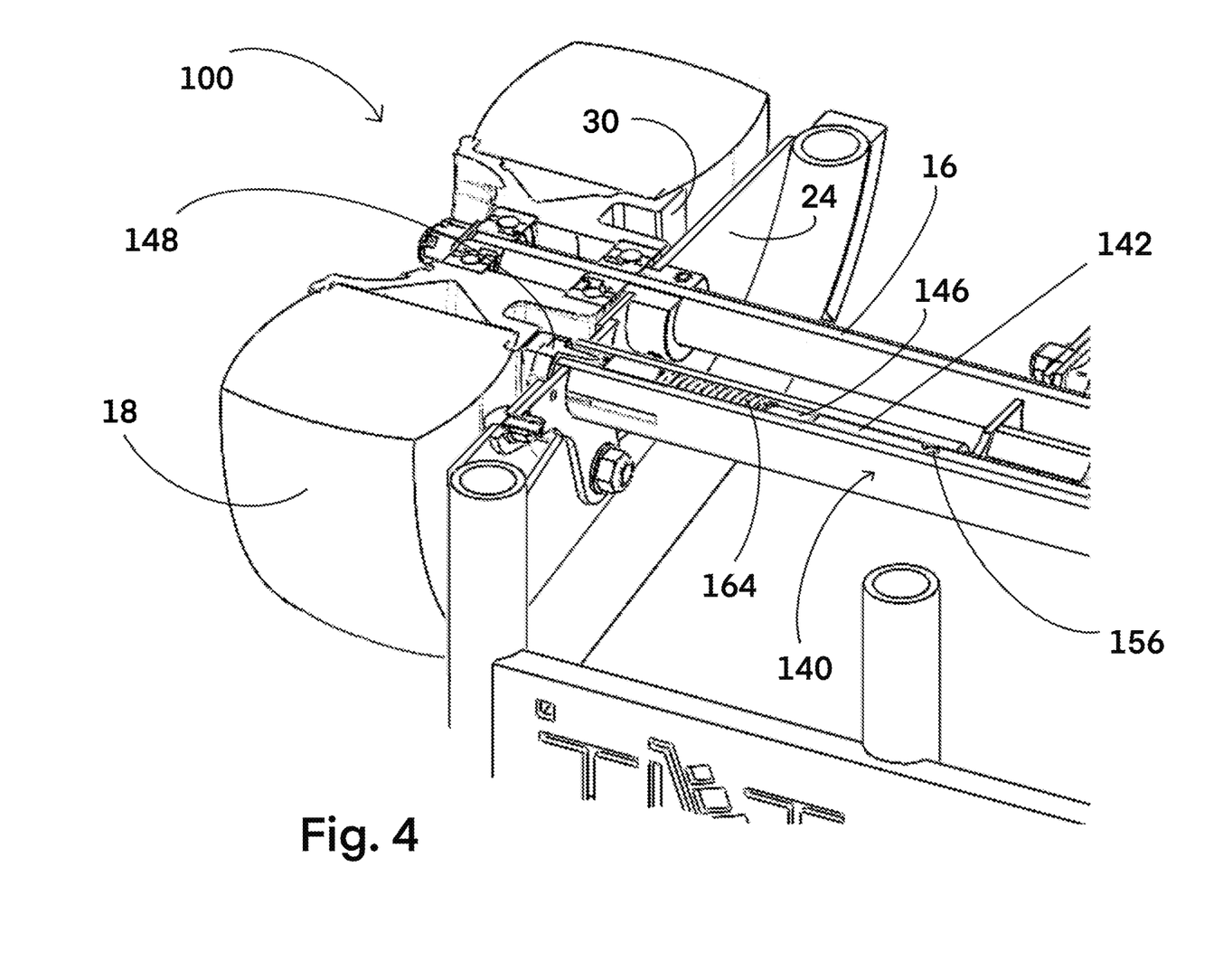
FIG. 4 is a cutaway detailed view of an embodiment of a braking mechanism of the invention.

FIG. 4 shows the assembled components of the braking assembly 100. The activation mechanism 140 is connected to the dolly through two holes 22 in side plates 24 of the dolly 10. The activation mechanism is parallel to the axle 16 and positioned such that the brake pads 148 engage a surface 30 of the wheel rims 32.

Figure 5:
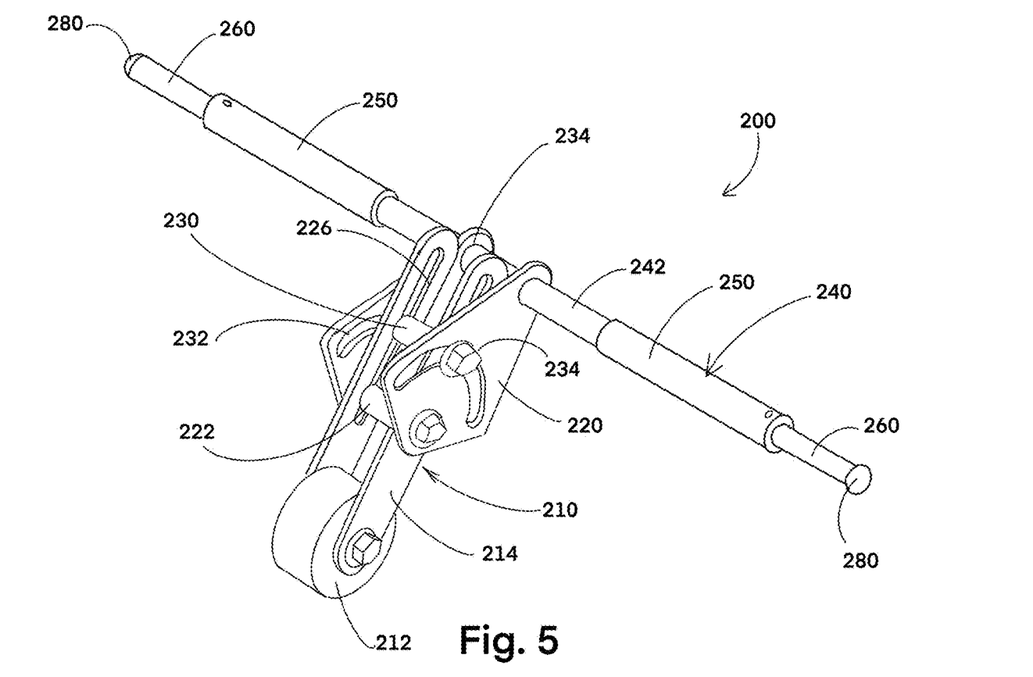
FIG. 5 is a perspective view of an embodiment of a braking mechanism of the invention.
Figure 6:
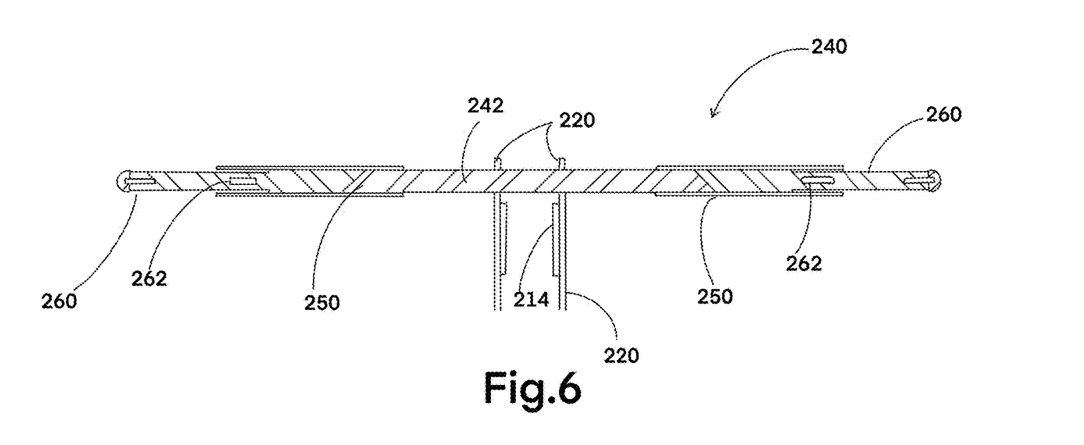
FIG. 6 is a cutaway view of the activation mechanism shown in the embodiment of FIG. 5; and, FIG. 7 is a perspective view of an embodiment of the invention.

Another embodiment of a braking system 200 is shown in FIGS. 5-6. The braking mechanism 200 generally includes a lever assembly 210, and an activation mechanism 240. The lever assembly 210 includes a lever wheel 212 that contacts the ground when the dolly is tilted rearwardly. The lever wheel 212 is held in place by a wheel bracket 214, which is connected to an adjustment bracket 220. The wheel adjustment bracket is connected to the activation mechanism 240.

The wheel bracket 214 is connected to the adjustment bracket 220 with two cross members that include fasteners that may be tightened or loosened for fixation and adjustment, respectively, of both the distance between the lever wheel 212 and the ground, and an angle that the wheel bracket 214 extends from the adjustment bracket 220. The adjustable length and angle components of the relationship between the wheel bracket 214 and the dolly allow the user to find an optimal brake engagement angle when using the dolly to transport a load down various ramp inclines.

The first cross member is the length adjustment cross member 222. The length cross member 222 passes through two aligned holes (not shown) in the adjustment bracket, and two longitudinal slots 226 in the wheel bracket 214. Loosening the fastener 228 of the length adjustment cross member 222, allows the wheel bracket 214 to slide longitudinally relative to the adjustment bracket 220.

The second cross member is the angle adjustment cross member 230. The angle adjustment cross member 230 passes through curved slots 232 in the adjustment bracket 220, and through the longitudinal slots 226 of the wheel bracket 214. The angle adjustment cross member 230 is held in place with a fastener 234. Loosening the fastener 234 allows the wheel bracket 214 to be rotated around the holes 224 in the wheel bracket 214. In this regard, the curved slots 232 have a radius equal to the distance between the center of the holes 224 and the center of the curved slots 232.

The activation mechanism 240 passes through holes 234 in the adjustment bracket 220. The activation mechanism 240 generally includes a center cam 242, two hubs 250, two plungers 260, and two brake pads 280.

As best seen in FIG. 6, the center cam 242 rides within the hubs 250, which are fixed to the dolly. The center cam 242, being connected to the adjustment bracket, rotates within the hubs 250 when the lever 210 is moved against the ground. The center hub 242 has angled ends 244 that correspond and interface with angled ends 246 of the plungers 260. The plungers 260 extend through the hubs, and are prevented from rotation during axial translation with fasteners 248 that extend through longitudinal slots 262 formed in the plungers 260.

In operation, when the lever 210 rotates upwardly in response to interference with the ground as the dolly is tilted rearwardly, the center cam 242 is rotated. As the angled ends 244 of the center cam 242 rotate, they are no longer complementary to the angled ends 246 of the plungers because the plungers are prevented from rotation by the fasteners 248. As a result, the angled ends 244 of the center cam 242 push the angled ends 244 of the plungers 260 outwardly. Brake pads 264 at the ends of the plungers 260 then act against the wheel rim surfaces 30.

Figure 7:
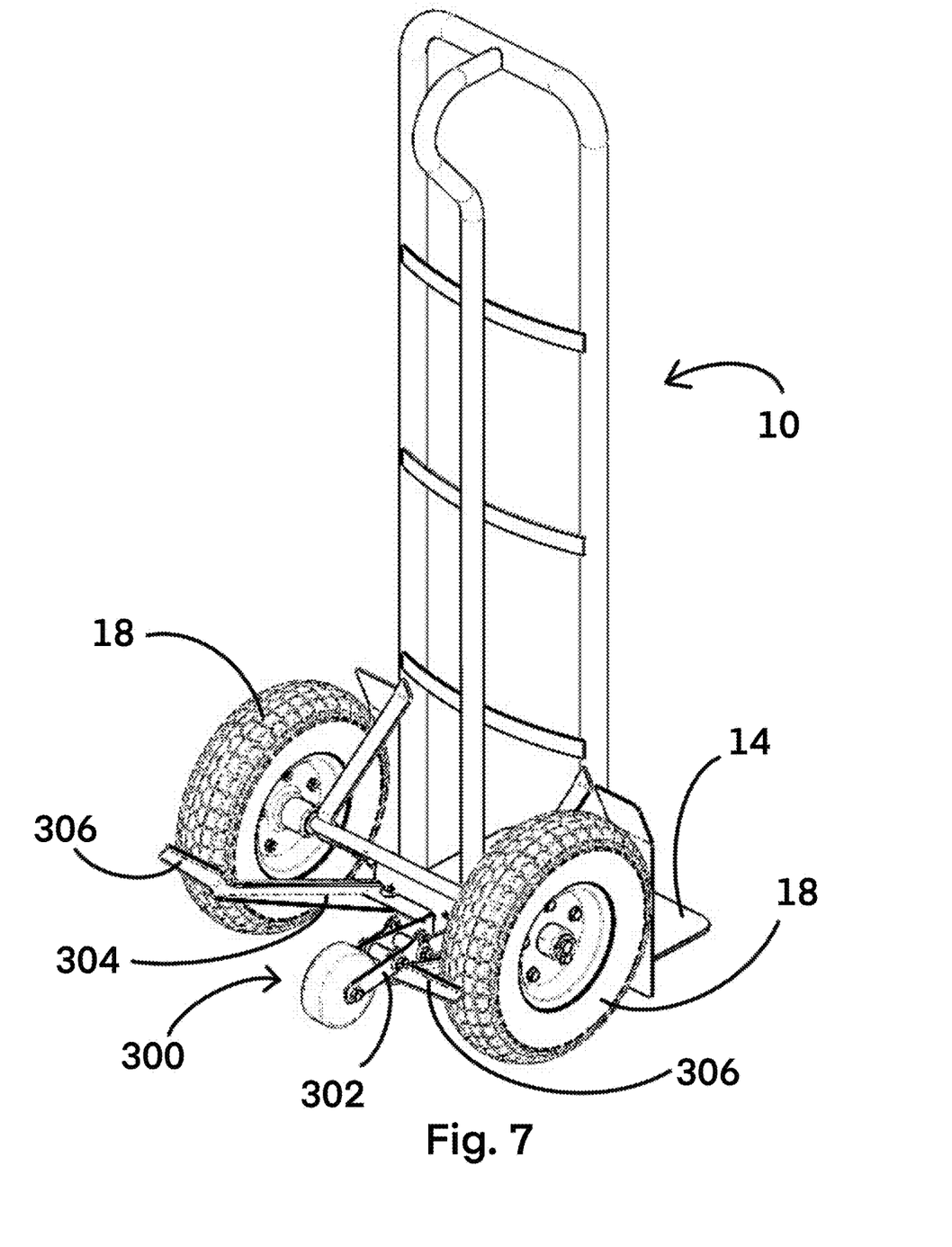

Referring now to FIG. 7, a simple embodiment 300 of a braking mechanism is shown attached to a hand truck 10. The braking mechanism 300 includes an activating lever 302 that is connected to a pair of arms 304, each having a brake 306 that is near the wheel 18 of the hand truck.

The lever 302 includes a wheel 308 at one end that engages the ground surface when in use. The lever is connected at an opposite end to the arms 304 in an adjustable manner such that the angle of activation of the brakes may be adjusted as necessary.

The brakes 306 are shown as blades that engage the tires, but other engagement surfaces are considered within the scope of the invention and include plates, skids, bars, boots, high-friction wheels, and rollers, just to name a few non-limiting examples.

The lever may also be lifted and locked in an upward, disengaged position using a disengaging mechanism such that the wheel 308 does not contact the ground surface, even when the truck is tilted.

In operation, a user places a load on the hand truck, in a typical fashion, and tilts the hand truck toward the user such that the load plate 14 of the hand truck is off the ground, and the totality of the load is being supported by the wheels 18. As the hand truck continues to be tilted toward the user, the wheel 308 contacts the ground and causes the brake mechanism to begin engaging and increasing the amount of friction on the wheels.

The braking force applied to the wheels gradually increases the more the hand truck is tilted, until the wheels are no longer allowed to rotate. Thus, in the event the hand truck is dropped, the wheels are prevented from rolling and the load stays in place on the ramp, such that it may be retrieved by lifting the handle on the hand truck.

There are many different braking mechanisms contemplated by the invention, all of which are activated by the pivoting of the lever. For example, one embodiment shows a braking assembly that includes a brake barrel that houses opposing brake arms. The brake arms include dowel pins that ride in an angled slot. Thus, when the brake lever is actuated, the dowel pins are translated longitudinally outward due to the angle of the slots. The brake pads are connected to the ends of the arms and are pushed outwardly into the braking surfaces attached to the wheels.

In another embodiment, the brake arms are constructed to pivot and are slightly longer than necessary to reach the braking surface when they are aligned parallel with the wheel axel. They are connected at an oblique, non-zero angle to each other when the brakes are disengaged. When the brake wheel assembly is activated, the intersection or mid connection point of the two brake arms is pushed toward a position whereby the angle approaches zero (or 180 degrees) and the brake pads are pushed outward into the braking surfaces.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A braking mechanism for a controlling a downhill descent of a hand truck comprising:
    a lever assembly extending rearwardly from a hand truck and elevated above the ground by a predetermined amount when the hand truck is not tilted rearwardly, and further positioned such that if the hand truck is tilted rearwardly by a predetermined amount, the lever assembly contacts a supporting surface on which the hand truck is being used, and further rearward tilting of the hand truck relative to the supporting surface causes the lever assembly to pivot relative to the hand truck;
    an activation mechanism connected to the lever assembly such that the pivoting of the lever assembly to a brake engagement angle results in interference between the activation mechanism and wheels of the hand truck;
    wherein the activation mechanism comprises a center hub connected to the lever assembly and plungers located on outside ends of the center hub that translate axially and outwardly when the center hub is rotated due to the rearward tilting of the hand truck.

2. The braking mechanism of claim 1 wherein the lever assembly includes a pivot angle adjustment cross member, the angle adjustment cross member riding in a curved slot such that the lever assembly may be adjusted to change the optimal brake engagement angle.

3. The braking mechanism of claim 1 wherein the center hub comprises angled slots and each of the plungers comprise pins that ride in the angled slots, wherein interference between the angled slots and the pins cause the plungers to translate axially.

4. The braking mechanism of claim 1 wherein the interference between the activation mechanism and the wheels of the hand truck comprises contact between a brake pad and a braking surface of a rim of one of the wheels of the hand truck.

5. The braking mechanism of claim 1 wherein the interference between the activation mechanism and the wheels of the hand truck comprises contact between two brake pads and corresponding braking surfaces of a rim of each of two of the wheels of the hand truck.

6. A method of controlling a downhill descent of a hand truck comprising:
   equipping the hand truck with a braking mechanism that interferes with rotation of wheels of the hand truck as the hand truck is tilted rearwardly; wherein the braking mechanism includes brake pads that translate outwardly into rims of the wheels of the hand truck when the braking mechanism contacts a supporting surface on which the hand truck is being used;
   standing behind the hand truck while facing the hand truck;
   tilting the handtruck rearwardly to lift a load supported by the hand truck off the supporting surface;
   pushing the hand truck forward down a hill;
   controlling a rate of descent by altering an amount of rearward tilt thereby altering a pressure the brake pads place on the rims of the wheels.

7. The method of claim 6 wherein equipping the hand truck with the braking mechanism that interferes with rotation of wheels of the hand truck as the hand truck is tilted rearwardly comprises equipping the hand truck with the braking mechanism such that the braking mechanism contacts a supporting surface on which the hand truck is being used once the hand truck is tilted rearwardly to a brake engagement angle.

8. The method of claim 7 wherein the braking mechanism contacts the supporting surface with a wheel.

9. A hand truck comprising: a frame;
a loading tray; an axle;
wheels connected to ends of the axle;
a braking mechanism that contacts a supporting surface on which the hand truck is being used when the hand truck is tilted rearwardly, the braking mechanism interfering with rotation of the wheels when the hand truck is further tilted rearwardly to a brake engagement angle such that a rotational speed of the wheels may be controlled by tilting the hand truck rearwardly, past the brake engagement angle;
wherein the braking mechanism comprises:
a lever assembly extending rearwardly from the hand truck such that if the hand truck is tilted rearwardly, the lever assembly contacts the supporting surface, and further rearward tilting of the hand truck cause the lever assembly to pivot relative to the hand truck;
an activation mechanism connected to the lever assembly such that the pivoting of the lever assembly past the brake engagement angle causes the interference between the braking mechanism and the wheels of the hand truck and including a center hub connected to the lever assembly and plungers located on outside ends of the center hub that translate axially and outwardly when the center hub is rotated due to the rearward tilting of the hand truck.

10. The hand truck of claim 9 wherein the lever assembly includes a pivot an angle adjustment cross member, the angle adjustment cross member riding in a curved slot such that lever assembly may be adjusted to form a bend, thus controlling a rearward tilt position of the hand truck that result in contact between the lever assembly and the supporting surface.

11. The hand truck of claim 9 wherein the center hub comprises angled slots and each of the plungers comprise pins that ride in the angled slots, wherein interference between the angled slots and the pins cause the plungers to translate axially.

\* \* \* \* \*